May 31, 1955 S. HANSEN 2,709,770

STEPPED SIGNAL PRODUCING SYSTEM

Filed Aug. 15, 1951 2 Sheets-Sheet 1

INVENTOR.
SIEGFRIED HANSEN.
BY Nicholas T Volsk
atty

May 31, 1955 S. HANSEN 2,709,770

STEPPED SIGNAL PRODUCING SYSTEM

Filed Aug. 15, 1951 2 Sheets-Sheet 2

INVENTOR.
SIEGFRIED HANSEN.
BY
Nicholas T Volk
atty.

2,709,770

STEPPED SIGNAL PRODUCING SYSTEM

Siegfried Hansen, Los Angeles, Calif., assignor, by mesne assignments, to Hughes Aircraft Company, a corporation of Delaware Application August 15, 1951, Serial No. 241,997

4 Claims. (Cl. 315—24)

This invention relates to a stepped signal producing system and more particularly to a system utilizing the summation of potential increments to produce a stepped output signal.

Recurring stepped signals are primarily useful in connection with certain types of number storage devices employed in electronic binary computer systems. One type of storage device employs cathode ray or storage tubes which store the binary signals in the form of discrete spots on their respective dielectric or target electrode surface, each of the spots being produced by the electron beam of the tube and charged to either of two potential levels to indicate thereby either of the two digits of the binary number system.

Stepped deflection signals must be applied to the deflection plates of the storage or cathode ray tube to deflect the electron beam so that these spots are formed on the associated storage surface in the first instance, the charging thereof being provided by additional circuitry. Each step of the deflection signal applied to the vertical deflection circuit results in the electron beam of the tube producing a single spot on the storage electrode, while each cycle of steps of the vertical deflection signal results in a single vertical line of spots. If another stepped deflection signal, each step of which is equal in duration to an overall cycle of the vertical deflection signal steps, is applied simultaneously to the horizontal plates, a number of lines of vertical spots is produced on the storage surface, each of the vertical lines occurring in response to a step in the signal applied to the horizontal plates.

The known deflection voltage systems for producing such a spot array are bulky and complex because of their particular mode of operation. For example, an article by J. P. Eckert in the "Proceedings of the I. R. E.," vol. 38, No. 5, May 1950, page 105, discloses a stepped signal producing system, based on the summation of controlled increments of current, which employs five vacuum tubes per stage, one stage for each step of the deflection signal. This complexity is brought about, in part, by the use of two tubes in each stage as constant current regulators, as is necessary for the summation of the current increments.

Another system, described by F. C. Williams in his article "Storage System for Use with Binary-Digital Computing Machines" appearing in the Proc. of the Institution of Electrical Engineers, vol. 96, part III, Number 40, March 1949, pages 81–98 also utilizes a controlled summation of current increments and is also quite complex in operation and circuitry.

The stepped output signal presented by the disclosed system is produced by summation of potential rather than current increments. A summation of this type provides the basis for a very simple structural embodiment containing few electrical components, which produces an accurate stepped signal output suitable for producing an array of spots when applied to the deflection systems of a cathode ray or storage tube.

Another feature possessed by the disclosed apparatus which makes it particularly suitable for use with computer systems is that the steps of its output signal are formed with negligible delay upon receipt of input pulses. Thus, these input pulses may by synchronized with the computer signals which are to be stored, and each spot, upon its initial formation on the dielectric electrode surface, may be charged simultaneously with its formation.

It is, therefore, an object of this invention to provide a stepped output signal producing system utilizing a summation of potential increments.

Another object of this invention is to provide a device utilizing a summation of potential increments to produce a stepped output signal which, when applied to the deflection plates of a storage tube, produces an array of discrete spots on the target electrode thereof.

Another object of this invention is to provide a device actuated by input pulses to produce, by a summation of potentials, a stepped output signal, each of the steps of the output signal occurring in response to an input pulse.

A further object of this invention is to provide a device utilizing a summation of potential increments to produce a recurring output signal having a plurality of steps, where each of said steps occurs in response to an input signal.

A still further object of this invention is to provide a device utilizing the summation of potential increments to produce two recurring stepped output signals which, when applied to the two deflection circuits, respectively, of a storage tube, causes the electron beam of the tube to produce an array of spots on the storage electrode thereof.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figs. 4, 4*a* and 4*b* are schematic representations of the patterns produced on the target electrode of a storage tube, according to this invention.

Figure 1:
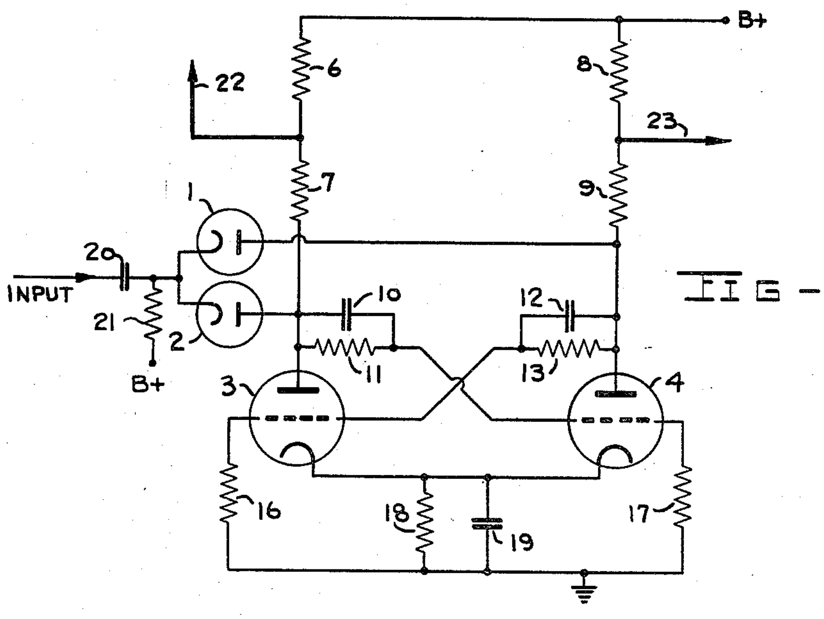
Fig. 1 is a circuit diagram of a flip-flop suitable for use in this invention.
Figure 2:
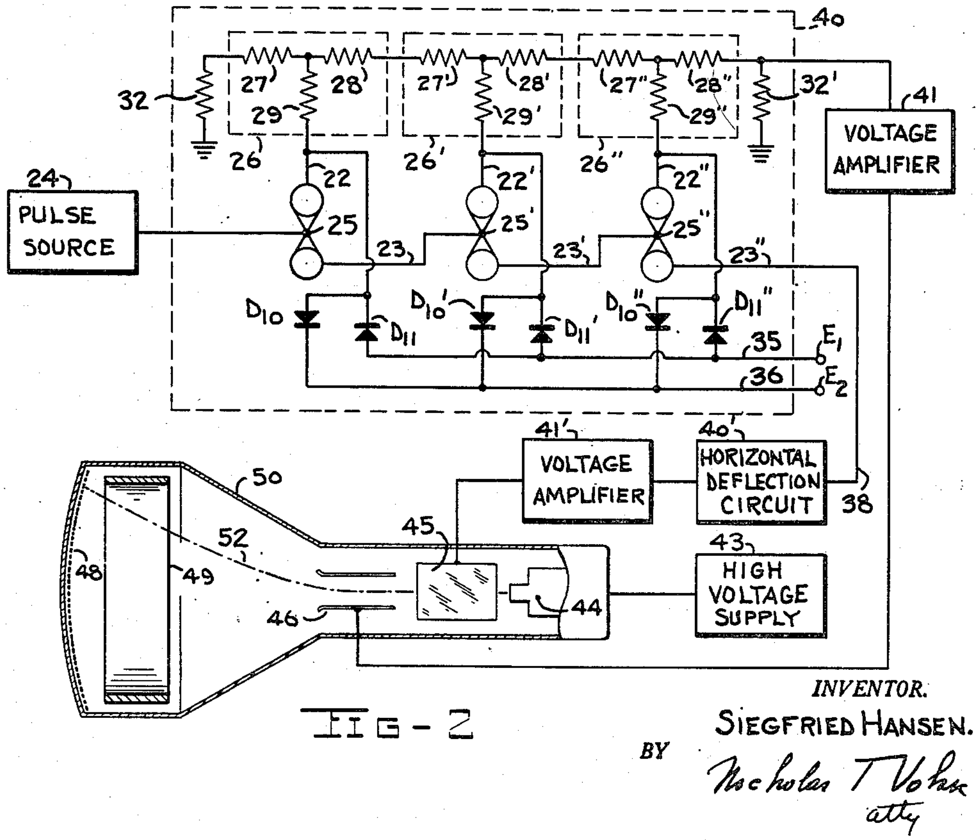
Fig. 2 is a schematic diagram of one embodiment of this invention.

Referring now to Fig. 1, there is shown an individual bistable flip-flop circuit suitable for use in this invention, as disclosed in Fig. 2. This flip-flop is adapted for use in this invention from a scale-of-two flip-flop circuit, illustrated and described on pages 111 to 114 of the book, "Electronics" by Elmore and Sands, published in 1949 by McGraw-Hill Book Co., Inc., New York. However, it is to be understood that this particular flip-flop is only one of many flip-flop circuits suitable for use in this invention, and is illustrated only by way of example.

The bistable flip-flop of Fig. 1 comprises two triodes 3 and 4 whose plate electrodes are connected to a source (not shown) of positive potential B+ through resistors 6 and 7 in series, and resistors 8 and 9 in series, respectively. The grid of triode 4 is connected by a paralleled resistor 11 and condenser 10 to the plate electrode of triode 3, while the grid of triode 3 is connected by paralleled resistor 13 and condenser 12 to the plate of triode 4. The grids of triodes 3 and 4 are also connected to ground through grid resistors 16 and 17, respectively, the cathodes of triodes 3 and 4 are connected together, the common junction being connected to ground through paralleled resistor 18 and condenser 19.

Triggering pulses from a pulse source (not shown) are applied to the flip-flop plates through a differentiating circuit, coupled to the plates of triodes 3 and 4 through diodes 2 and 1, respectively. The differentiating circuit comprises a series condenser 20 and shunt resistor 21, the resistor 21 being coupled to the source of B+ potential to maintain the cathodes of diodes 1 and 2 at that potential and, accordingly, to render them effective to transmit any negative pulses applied thereto from the differentiating circuit.

In operation, assume that triode 4 is conducting and triode 3 is non-conducting. If the potential applied to the differentiating circuit is suddenly reduced by 50 volts, for example, the differentiating circuit responds thereto to produce a negative pulse, the negative pulse being coupled to the grid of triode 4 through diode 2 and condenser 10. This negative pulse causes triode 4 to cease conduction and, accordingly, the resulting plate potential rise is transferred through condenser 12 to the grid of triode 3 to initiate conduction thereof. Since the circuitry is symmetrical about triodes 3 and 4, the next signal drop applied to the differentiating circuit would produce another reversal of conduction states and triode 4 would once more be conducting while triode 3 would be non-conducting.

One output potential from the flip-flop is taken between the plate resistors 6 and 7 of triode 3 on conductor 22, and the other output potential is taken between plate resistor 8 and 9 of triode 4 on conductor 23. The output potential on conductor 23 will be relatively low, and the output potential on conductor 22 will be relatively high when triode 4 is conducting and triode 3 is non-conducting, respectively, while the potentials on these output conductors will be reversed when the flip-flop is in its other state, i. e., triode 3 is conducting and triode 4 is non-conducting.

Fig. 2 discloses a stepped potential producing system 40 constituting this invention, as it is utilized in a system for producing a square array of spots on the target electrode of a storage tube 50. System 40 includes a counter chain connected in parallel to a ladder network. The counter chain comprises scale-of-two or bistable flip-flops 25, 25′ and 25″. Flip-flop 25 is, for the purposes of this disclosure, the same bistable flip-flop as that illustrated in Fig. 1, while flip-flops 25′ and 25″ are similar thereto. The counter chain is fashioned by connecting the output conductor 23 of flip-flop 25 to the input of flip-flop 25′ and connecting the output conductor 23′ of flip-flop 25′ to the input of final flip-flop 25″. The resulting chain is a scale-of-eight counter chain inasmuch as eight input pulses must be applied to the input of the chain before the third or final flip-flop completes one cycle of operation. Obviously, additional scale-of-two circuits may be added to those illustrated to form a longer chain, the resultant chain being termed a scale-of-$2^n$ counter chain, where $n$ is the total number of flip-flop stages. Another type of counter chain particularly suitable for use in this invention is disclosed in application for patent, Serial No. 245,860, by Eldred C. Nelson, inventor, said application being filed on September 10, 1951, and entitled "High-Speed Flip-Flop Counter."

The ladder network comprises identical serially-connected T-section attenuating circuits 26, 26′, and 26″. Attenuating circuit 26 contains two interconnected resistor arms 27 and 28 and a resistor leg 29 connected to the junction between its arms, circuit 26 providing a 2:1 attenuation ratio measured across its two arms. The adjacent arms of T-section networks 26, 26′ and 26″ are connected together and the resultant ladder network is terminated at its ends by resistors 32 and 32′. Each of resistor arms 27, 28, 27′, 28′, 27″ and 28″ has a resistance of ½C ohms, where C is a constant determined by design considerations to be discussed later in this disclosure. Each of the resistor legs 29, 29′ and 29″ has a resistance of 2C ohms, while the terminating resistors 32 and 32′ each has a resistance of 3C/2 ohms. This particular resistance value of 3C/2 ohms for the terminating resistors terminates the network in its characteristic resistance, as determined by the above-cited values of its constituent parts.

The output conductors 22, 22′ and 22″ of flip-flop circuits 25, 25′ and 25″, respectively, are connected to the legs 29, 29′ and 29″ of T-sections 26, 26′ and 26″, respectively. A negative pulse source 24 is connected to the input of the first flip-flop 25, for applying negative pulses thereto. Flip-flop 25 is triggered by these pulses to produce on conductor 22 an output signal having alternately high and low potential levels. The output signal on conductor 22 appears across terminating resistor 32′ diminished in magnitude to 1/16 of its original value due to its being successively attenuated by sections 26, 26′ and 26″. The magnitude of this signal attenuation may be readily calculated by use of the network parameter values cited above. The signal is designated 300 in Fig. 3*a*.

The potential levels of the output signals appearing on output conductors 22 and 23 of flip-flop 25 are the inverse of each other, i. e., when one is high the other is low, etc. Thus, when the signal on conductor 22 rises from the low to the high potential level, the signal on conductor 23 falls from the high to the low potential level. The differentiating circuit in flip-flop 25′, corresponding to the differentiating condenser 20 and resistor 21 in Fig. 1, transforms each of the potential falls appearing on conductor 23 into a corresponding negative pulse which triggers flip-flop 25′. Waveform 301 of Fig. 3*b* represents the output signal from conductor 22′ of flip-flop 25′ as it appears across resistor 32′ after attenuation by sections 26′ and 26″. Its output frequency is half that of the output signal of flip-flop 25, since a full cycle of signal 300 is required to trigger flip-flop 25′ once. The potential of output signal 301 is ⅛ of its original value, or twice that of flip-flop 25, since signal 301 is attenuated by one less section.

Final flip-flop 25″ is triggered by the output signal produced on conductor 23′ by flip-flop 25′ in the same manner that flip-flop 25′ is triggered by the output signal from flip-flop 25. Since the output signal on conductor 22″ of flip-flop 25″, as illustrated by waveform 302 of Fig. 3*c*, is diminished only by its associated attenuation network 26″, its magnitude is twice that of the output signal from flip-flop 23 across resistor 32′ and four times that of the output signal from flip-flop 23 across resistor 32′. The magnitude of the output signal of flip-flop 25″ is thus reduced to ¼ of its original value through its attenuation by this network, as may be calculated by using the values previously cited for the circuit parameters. The three signals 300, 301 and 302 represent the final signals appearing across the terminating resistor 32′, as derived from flip-flops 25, 25′ and 25″, respectively. Waveform 304 represents the signal resulting from the summation of these three signals and represents the stepped output signal of this portion of the apparatus.

Although a single ladder network is illustrated, the output conductors 22, 22′ and 22″ of the respective flip-flops may be coupled to separate ladder networks, each of the networks providing an attenuation factor equal to that confronted by the output signals appearing on the respective conductors in the present embodiment. All of such separate attenuation networks may be jointly terminated by a single terminating resistor which would accordingly provide the proper summation of the respective attenuated signals. The present embodiment may be thought of in such a fashion by considering output conductor 22 as being coupled to a network comprising sections 26, 26' and 26'' while output conductor 22' could be considered as being coupled to a network comprising sections 26' and 26'', etc.

Figure 3:
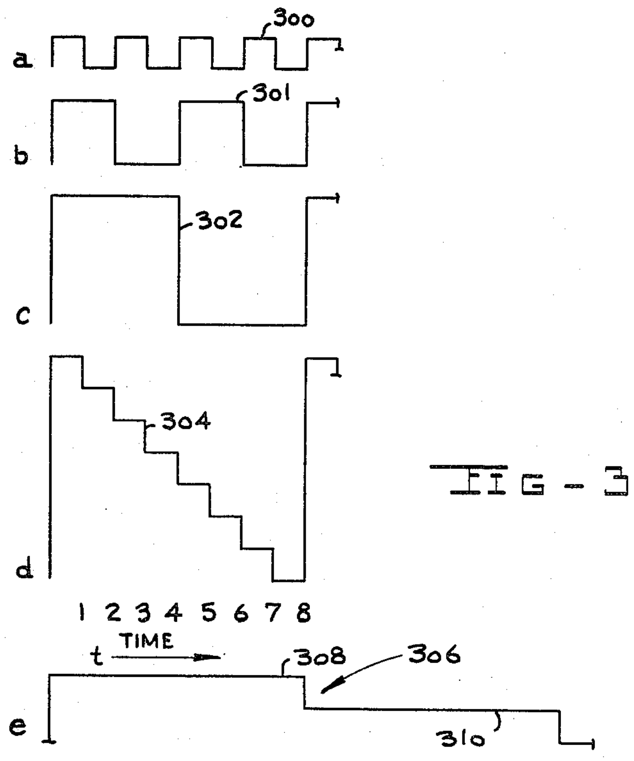
Fig. 3 is a group of signal waveforms illustrating the operation of this invention.

As will be noted from Fig. 3*d*, the successive steps decrease in magnitude along the time axis. If desired, the order may be reversed and the steps successively increase in magnitude by omitting the use of the output conductors 22, 22' and 22'' of the respective flip-flops and by coupling the legs of the respective T-sections directly to output conductors 23, 23' and 23'', respectively. In such an embodiment, the potential levels of each of the signals represented by waveforms 300, 301 and 302 of Fig. 3 would be inverted and the subsequent summation would provide an output signal whose waveform would contain steps of consecutively increasing magnitude.

Since the magnitude of the signal produced by flip-flop 25'' across resistor 32' is twice that of the signal produced by flip-flop 25' across the same resistor, and the magnitude of the signal produced by flip-flop 25' is twice that of the signal produced by flip-flop 25'' across output resistor 32', it is essential that each flip-flop stage of the chain provide output signals having the same high and low potential levels in order to maintain equal voltage steps in the stepped waveform output signal. This is accomplished by coupling a voltage clamping means to the output of each flip-flop whereby all flip-flops produce an identical high potential level signal and an identical low potential level signal in their two signal levels, respectively. Bus 36, carrying a high potential $E_2$, is connected to the output terminals of flip-flops 25, 25' and 25'', through diodes $D_{10}$, $D_{10}'$ and $D_{10}''$, respectively, while bus 35, carrying a low potential $E_1$, is connected to the same output terminals of flip-flops 25, 25' and 25'' through diodes $D_{11}$, $D_{11}'$ and $D_{11}''$, respectively. Potential $E_2$ is maintained at a constant potential value, by a well-regulated power supply (not shown), which is slightly less in value than the high potential level of the output signal produced by the flip-flops. The diode connected from each flip-flop circuit to bus 29 conducts only when its respective flip-flop is producing its high potential signal level and serves to clamp the high potential level of its flip-flop at the potential $E_2$. Potential $E_1$, on bus 28, is maintained slightly greater than the low potential output signal levels of the flip-flop circuits. The diodes connected between bus 35 and the output terminals of the respective flip-flop circuits conduct only when their respective flip-flops are producing their low potential output signal and clamp the low potential level of the output signal at the potential $E_1$. As will be noted, the potentials, $E_1$ and $E_2$ are electrically isolated from one another by the back resistances of each pair of diodes associated with each flip-flop circuit. The potential $E_2$ is isolated from the low potential level output signal of flip-flops 25, 25' and 25'' through the back resistance of diodes $D_{10}$, $D_{10+}'$, and $D_{10}''$, respectively, and potential $E_1$ is isolated from the high potential level signal of flip-flops 25, 25' and 25'' through the back resistance of diodes $D_{11}$, $D_{11}'$ and $D_{11}''$, respectively.

In determining the value of C in constructing the ladder attenuation network, the forward resistances of the clamping diodes must be considered in setting the lower permissible limit of C. If C is relatively small, then the current flow through the network will be relatively large and will produce correspondingly appreciable potential drops across the forward resistance of each conducting diode, which, in turn, will lower the effective potential applied therefrom to the network. Since the forward resistances of the diodes will vary and the total current drawn will vary in accordance with the particular step being produced, uneven magnitudes between the step levels will result in the output waveform. On the other hand, if C is excessively large, the ladder network will be draw a relatively small current, but stray capacitance from the ladder components and connections to ground will shunt off a portion of the energy and reduce the speed of response of the network. Also, if C is too large, the load across resistor 32' will reduce the effective terminating resistance and disrupt the uniform step pattern of the output signal by the resulting mismatch of the network termination. In practice, a value of 100,000 ohms for C has been found eminently suitable for most applications.

Another factor affecting the output signal accuracy is variation between the attenuation values of the various T-sections. Attenuation ratios of more than 2:1 for all sections will result in an increase in magnitude between adjacent steps or levels in the output signal waveform, whereas attenuation values of less than 2:1 may result in an overlap of some of the steps or levels.

This latter case of overlap, where each stage has less than a 2:1 attenuation ratio, results from the flip-flop output signals applied to the earlier stages of the ladder network being relatively less attenuated in magnitude, because of the exponential type of attenuation provided by the ladder, than were the signals applied to the later stages of the ladder. Under such conditions, all output signals appearing across resistor 32' approach each other in magnitude, and some of the higher potential steps in the output signal will possibly merge with one another to destroy the desired signal pattern. Upon such merger, a single output potential level would occur in the output signal for at least two successive input pulses to the counter chain with the consequent loss of information.

However, if each stage has an attenuation greater than 2:1, then the earlier flip-flop output signals will be relatively more attenuated than will be the signals from the later stages. This will result only in uneven magnitudes between the steps of the output signal. This type of attenuation deviation is obviously more desirable than the example noted above where overlapping occurred, since, in this case, no loss of information or inaccuracies result from the different magnitudes between the various signal levels.

In constructing the ladder network, the effects of attenuation deviation noted above should be taken into account when specifying tolerances for the resistor components. Since no loss of information results from having the attenuation factor of each section greater than 2, an attenuation factor tolerance of $\pm 1\%$ for example, should be expressed as $2+2\%-0\%$ or $2.01\pm.01$. In order to prevent overlapping, no tolerance should be stated which would allow a network to have an attenuation ratio of less than 2:1.

The tolerances to which the attenuation of the individual T-sections must be held to affect the step magnitudes of the output signal the same amount, vary with the placement of the sections relative to the output resistor 32'. This arises from the fact that the output signal of flip-flop 25'' has twice the effect on the magnitude of the output signal 304 as does the output signal of flip-flop 25', and four times the effect as does the output signal of flip-flop 25. Hence, the attenuation factor of attenuation network 26' associated with flip-flop 25' may be off twice as much from the theoretically optimum value of 2 as is attenuation network 26'' and yet affect the step accuracy of the output signal 304 the same amount. In the same manner, the attenuation value of network 26 may have four times the error as does network 26'' and the error therein will affect the accuracy of the output waveform the same amount. Thus, the tolerance specified for the attenuation network 26' need be only one-half as close as that specified for network 26'', and network 26 one fourth as close as that for network 26'', if the inaccuracies in all sections are to equally affect the step uniformity of the output signal. As an example, if the attenuation of T-section 26″ is specified as 2+2%—0%, then section 26′ need only be 2+4%—0%, and section 26, 2+8%—0%.

Figure 4:
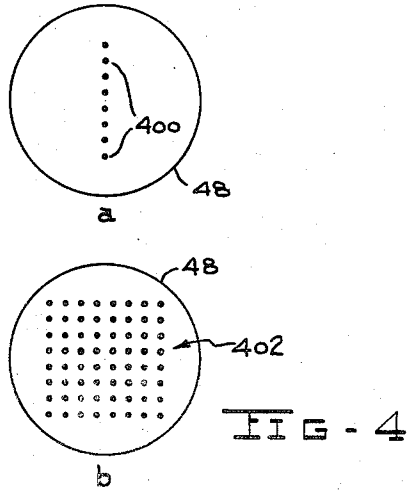

The stepped output signal 304 is preferably impressed on a voltage amplifier 41 whose output is connected directly to the vertical deflecting plates 46 of a storage tube 50. Storage tube 50 is of any well-known type, and comprises, in addition to vertical deflection plates 46, an electron gun 44, horizontal deflection plates 45, collector electrode 49 and target electrode 48. A high voltage supply 43 is connected to electron gun 44 of tube 50, and gun 44 emits an electron beam 52, which strikes the target electrode 48. The signal thus applied to deflection plates 46, causes the electron beam 52 to move in a discontinuous jump and stop fashion across target electrode 48 and produce a vertical line of spots 400, as illustrated in Fig. 4*a*. Each of the distinct spots is formed by a single step in the output signal from unit 40.

To produce a square array of spots 402 on the target electrode 48, as illustrated in Fig. 4*b*, it is necessary to impress on the horizontal deflection plates 45, a stepped signal 306 as partially illustrated in Fig. 3*e*, similar to signal 304, but having an overall period eight times as long as that of signal 304. Only two individual rectangular steps 308 and 310 of signal 306 are illustrated in Fig. 3*e*, each of the steps being equal to the period of the stepped wave pattern of signal 304, and each step producing a single line of vertical spots. When signal 304 is impressed on the vertical plates, and signal 306 is impressed on the horizontal plates, the pattern 402 of Fig. 4*b* will be produced on the cathode ray tube screen.

Signal 306 is produced by a horizontal deflection circuit 40′, identical to the vertical deflection circuit 40. To synchronize the operation of circuits 40 and 40′, output conductor 23″ of the final flip-flop 25″ of circuit 40 is connected to the first flip-flop of circuit 40′ with the result that signal 302 controls the operation of circuit 40′ by triggering the first flip-flop therein once for each of its complete cycles.

The deflection system comprising circuits 40 and 40′ produces an array of 8×8, or 64 spots on target electrode 48. If additional spots are desired, additional stages may be added to the vertical and horizontal deflection systems 40 and 40′, the number of spots being ultimately limited by the resolving power of beam 35, the transverse leakage of target electrode 48, and by electron redistribution. The number of signal steps, and consequently the number of spots produced by deflection system 40, as illustrated by Fig. 4*a*, is a geometric progression $2^n$, where $n$ is the number of stages in deflection system 40. The total number of spots in an array, as shown in Fig. 4*b*, is equal to $2^n$, where $n$ is the total number of stages in both systems 40 and 40′. A rectangular pattern of spots may be provided by employing vertical and horizontal deflection systems which contain different numbers of stages. However, the available area of a conventional circular target electrode is most efficiently utilized by a square pattern array. An interchange of the output conductors leading to the vertical and horizontal plates, respectively, of storage tube 50 would reverse the order of scan of beam 52 and cause its principal sweep to be horizontal rather than vertical.

Each spot formed by electron beam 52 on target electrode 48 is charged to the potential of collector electrode 49 in a complex manner, a discussion of which is not deemed pertinent to this invention. However, in a digital computer application, it is imperative that each spot, upon its formation, be charged to a potential representing a binary digit occurring in the computation process and this requires a definite correlation between each successive step of the output signal from deflection system 40 and each successive computer signal representing a binary number. The steps of the output signal produced by this invention may be quite readily coordinated with any such computer signals since each step is formed, with negligible delay, upon receipt of an input pulse from pulse source 24. Thus, by synchronously relating the pulses produced by source 24 to the binary number pulses occurring in the computer, each spot thus formed by beam 52 will be concurrently charged to a potential representing a binary digit.

As will be apparent to anyone skilled in the art, various modifications may be made in the circuit illustrated in Fig. 2 without departing from the scope and spirit of the invention. For example, other scale-of-two counting elements such as a relay circuit might be substituted for each flip-flop circuit in the scale-of-$2^n$ counter. Also, the particular utilization of circuit 40, as applied to a storage tube circuit, is not intended as a limitation of the scope of the invention as the circuit may be employed solely to produce a stepped waveform. Still further, it will be apparent to those skilled in the art that the invention is not limited to the use of a counter chain circuit as illustrated in Fig. 1, other classes of counters utilizing scale-of-two counting elements being readily substituted for the counter illustrated without departing from the spirit of the present invention.

In providing an array of spots for a storage electrode, it is not essential that horizontal deflection circuit 40′ be actuated by the output from final flip-flop 25″ of deflection circuit 40. A separate pulse source may be utilized to actuate circuit 40′, but synchronization between each pulse delivered thereby and each eighth pulse applied to the input of deflection circuit 40 from source 14 is necessary if a pattern similar to 402 in Fig. 4*b* is to be obtained.

What is claimed as new is:

1. A device for producing a stepped output potential, said device comprising a pulse actuated scale-of-$2^n$ counter chain, where $n$ is an integer, said counter chain comprising 1st, 2nd, . . . $n$th serially connected scale-of-two circuits, each of said circuits having an output terminal and said 1st circuit having, in addition, an input terminal, said counter chain being responsive to $2^n$ successive pulses applied to said input terminal for producing $2^n$ successively different sequences of signals on the said output terminals; 1st, 2nd, . . . $n$th attenuation sections, each of said sections having first, second and third terminals; means conductively connecting the first terminals of said 2nd, . . . $n$th sections to the second terminal of the immediately preceding section to form a ladder network; first and second resistor means, each of said resistor means having a resistance equal to the characteristic resistance of said ladder network; means conductively coupling said first resistance means between the first terminal of said first attenuation section and ground; means conductively coupling said second resistance means between the second terminal of the said $n$th attenuation section and ground, the signal produced across second resistance means being a summation of signals applied to the third terminals of said 1st, 2nd, . . . $n$th attenuation sections after attenuation thereof by said network; means conductively coupling the output terminals of said 1st, 2nd, . . . $n$th scale-of-two circuits to the third terminals of said 1st, 2nd, . . . $n$th attenuation sections, respectively; and pulse producing means conductively coupled to the input terminal of said 1st scale-of-two circuit of said chain for applying successive pulses to said chain to actuate said chain whereby a recurring signal having $2^n$ steps is produced across said second resistance means, each of said steps occurring in response to a pulse applied from said pulse producing means.

2. A system for producing an array of spots on the storage electrode of an electron beam storage tube having first and second deflection circuits, said system comprising: first and second deflection potential units, each of said units including 1st, 2nd, . . . $n$th actuable means for producing 1st, 2nd, . . . $n$th signals, respectively, each of said 1st, 2nd, . . . $n$th signals having a square waveform, said 2nd, 3rd, . . . $n$th signals having $$\frac{1}{2}, \frac{1}{2^2}, \ldots \frac{1}{2^{n-1}}$$

times the frequency and $2^1, 2^2, \ldots 2^{n-1}$ times the amplitude of said 1st signal, respectively, and means for combining said 1st, 2nd, . . . $n$th signals to produce an output signal having a stepped waveform, the 1st signal of said second deflection unit being ½, the frequency of the $n$th signal of said first deflection unit; means coupled to the 1st, 2nd, . . . $n$th signal producing means of said first deflection unit for simultaneously initially actuating said 1st, 2nd, . . . $n$th signal producing means of said first deflection unit; means for applying the output signal of said first deflection unit to the first deflection circuit of said storage tube whereby the electron beam thereof produces a line of spots on the storage electrode thereof; means coupled to the 1st, 2nd, . . . $n$th signal producing means of said second deflection potential unit for simultaneously initially actuating said 1st, 2nd, . . . $n$th signal producing means of said second deflection unit; and means for applying the output signal of said second deflection unit to the second deflection circuit of said storage tube whereby the electron beam thereof produces a plurality of lines of spots on the storage electrode thereof.

3. A system for producing an array of spots on the storage electrode of an electron beam storage tube having a pair of deflection circuits, said system comprising: first and second deflection potential units, each of said units including a signal actuated counter chain having an input terminal and a plurality of output terminals, said chain being responsive to each successive signal applied to said input terminal for producing a different sequence of signals on said output terminals; a ladder network including a plurality of attenuation sections having a common output circuit, one section for each output terminal of said chain, each of said sections having an input terminal and a different attenuation factor, the signal appearing across said common output circuit being the summation of signals applied to said input terminals after attenuation thereof by said sections, and means for applying the signal appearing on each output terminal of said counter chain to the corresponding input terminal of said network; means for applying successive first signals having a first repetition rate to the input terminal of the counter chain of said first unit to actuate said first unit whereby a stepped output signal is produced on the common output circuit of said first unit, each of said steps occurring in response to a first signal applied to the input terminal of the counter chain of said first unit; means for applying the output signal from the common output circuit of said first unit to one of the deflection circuits of the storage tube whereby the electron beam of said tube, produces a line of charged spots on the storage electrode thereof, each of said spots being produced in response to a step in the stepped output signal from said first unit; means for applying successive second signals having a second repetition rate, to the input terminal of the counter chain of said second unit to actuate said second unit, each of said second signals appearing simultaneously with a first signal, said first repetition rate being an integral multiple of said second repetition rate whereby a stepped output signal is produced on the common output circuit of the ladder network of said second unit, each of said steps occurring in response to a second signal applied to said second unit; and means for applying the stepped output signal from the common output circuit of said second unit to the other deflection circuit of the storage tube whereby the electron beam of the storage tube produces a plurality of lines of charged spots on the storage electrode thereof, each of said lines occurring in response to a step in the stepped output signal of said second unit.

4. A system for producing an array of spots on the storage electrode of a storage tube by the electron beam thereof, said tube having a pair of deflection circuits, said system comprising: first and second deflection potential devices, each of said devices including a pulse actuated scale-of-$2^n$ counter chain, where $n$ is an integer greater than 1, said chain having 1st, 2nd, . . . $n$th serially connected scale-of-two circuits, each of said circuits having an output terminal, said 1st scale-of-two circuits having, in addition, an input circuit, said chain being responsive to each pulse applied to said input circuit for changing the sequence of signal magnitudes presented by said output terminals in a predetermined order, a ladder network having 1st, 2nd, . . . $n$th serially connected attenuation circuits, each of said attenuation circuits having an input terminal, a first output circuit conductively coupled to said $n$th attenuation network, the signal appearing across said first output circuit being the summation of signals applied to the input terminals of said attenuation sections after attenuation thereof by said network, and means conductively coupling the output terminal of said 1st, 2nd, . . . $n$th scale-of-two circuits to the input terminal of said 1st, 2nd, . . . $n$th attenuation circuit, respectively; a second output circuit conductively coupled to the $n$th scale-of-two circuit of said first unit for providing a signal representative of each $2^n$ actuation of the counter chain of said first device; pulse producing means conductively coupled to the input circuit of said first device for actuating the chain of said first device, whereby the signal produced across the first output circuit of said first device varies in steps, each of said steps occurring in response to a pulse applied from the last-named means to said input circuit; means conductively coupling the first output circuit of said first device to one of the deflection circuits of the storage tube, whereby the electron beam produces a line of charged spots on the storage electrode of the tube, each of said spots occurring in response to a step in said stepped output signal; means conductively coupling the second output circuit of said first device to the input circuit of said second device for actuating the counter chain of said second device, the first output circuit of said second device presenting a stepped output potential, each of said steps occurring in response to $2^n$ pulses applied to said first device by said pulse source; and means conductively coupling the first output circuit of said second device to the other deflection circuit of said storage tube, the stepped output signal of said second device producing a series of lines of spots, each of said lines occurring in response to a step in the output signal of said second device.

References Cited in the file of this patent

UNITED STATES PATENTS

| | | |
|---|---|---|
| 2,447,233 | Chatterjea et al. | Aug. 17, 1948 |
| 2,448,762 | Beste | Sept. 7, 1948 |
| 2,465,355 | Cook | Mar. 29, 1949 |
| 2,474,266 | Lyons | June 28, 1949 |
| 2,486,391 | Cunningham | Nov. 1, 1949 |